(Model.)

F. WISNER.
END BOARD FOR WAGONS.

No. 262,876. Patented Aug. 15, 1882.

WITNESSES:
Benj. Andrews Jr.
C. Sedgwick

INVENTOR:
F. Wisner
BY Munn & Co
ATTORNEYS.

UNITED STATES PATENT OFFICE.

FRED WISNER, OF OLEAN, NEW YORK, ASSIGNOR TO HIMSELF AND JOHN M. WILLIAMS, OF SAME PLACE.

END-BOARD FOR WAGONS.

SPECIFICATION forming part of Letters Patent No. 262,876, dated August 15, 1882.

Application filed May 25, 1882. (Model.)

*To all whom it may concern:*

Be it known that I, FRED WISNER, of Olean, in the county of Cattaraugus and State of New York, have invented a new and Improved End-Board Fastener, of which the following is a full, clear, and exact description.

This improved end-board fastener consists of the strap-iron bar attached to the top edge of the end-board, having the ends forged round and extended through notches in the top of the side-boards, and also through flanged plates, also notched in the upper edges and secured to the side-boards, and being provided with a curved rib below the notch, whereon a nut which screws on the extension of the aforesaid top iron of the end-board to bind the end and sides together is secured by a groove on the face, so as to effectually prevent the end-board and side-boards from rising or falling with respect to each other, as hereinafter fully described.

Reference is to be had to the accompanying drawings, forming part of this specification, in which similar letters of reference indicate corresponding parts in all the figures.

Figure 1:
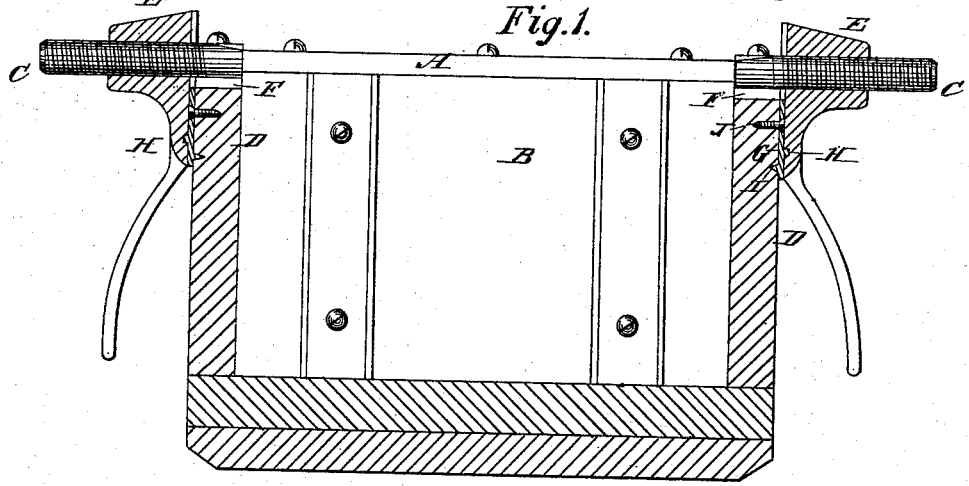
Figure 2:
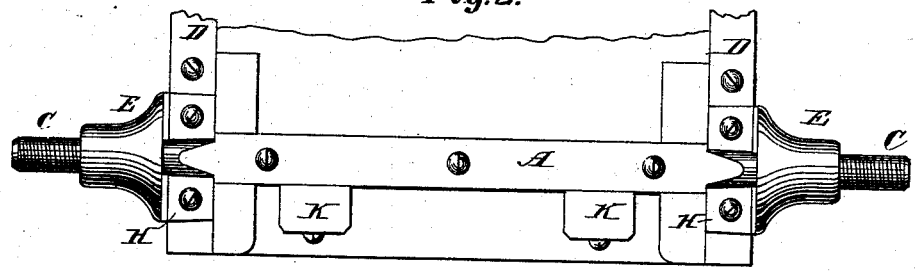
Figure 3:
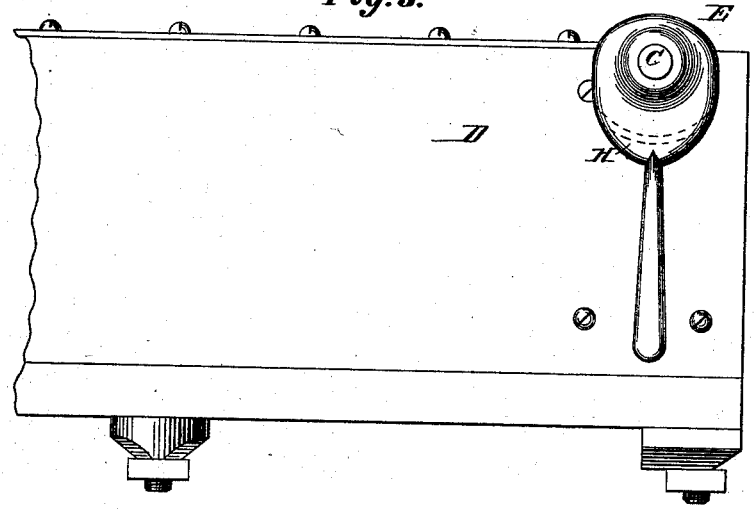

Figure 1 is a sectional elevation of a wagon-box, showing the arrangement of my improved end-board fastening. Fig. 2 is a plan view, and Fig. 3 is a side elevation.

A represents the flat iron bar usually attached to the upper edge of the end-board for a wearing-plate for the protection of the end-board. Instead of having this bar terminate at the ends of the end-board, I have the ends C extended beyond the side-boards D, and forged round and screw-threaded to receive the binding-nuts E to utilize said bar, instead of the rod commonly inserted through the side-boards, and cleats attached to the rear side of the end-board to bind the side and end boards fast. I thereby avoid the use and expense of the said rod, and besides make a simpler and more convenient arrangement for use, because instead of having to slide the rod through the holes of the cleats I notch the side-boards at F, so that the extensions C of the said bar drop readily into said notches, and to prevent the end-board from rising up I apply a plate, G, under the nuts E, with a curved rib, H, on its face circumferential to the axis of the rod on which the nuts turn, and provide the nuts with a corresponding groove in which the rib locks when the nut is screwed up and set with the handle down, so as to securely hold the end-board and side-boards together. The said rib is a segment of a circle, and the portion of the face of the nut having the groove is of larger radius than the rest of the nut, so that the groove is also segmental, whereby a quarter-turn of the nut, or thereabout, disengages the nut and allows the end-board to be raised. The plate G is fastened to the side of the side-board D by stud-pins I and screws J, and its flange H is also screwed to the top edge of the side-board.

It will be seen that the nuts E may be turned about three-quarters round before engaging with the ribs H, which is sufficient for slackening the end-boards enough to be taken out readily. The nuts E, being large on the face, afford substantial binding-power to effectually serve the required purpose, and thus save the expense of the rod commonly used, and the cleats K, which are commonly located close to the cleats of the side-boards, on account of the rod, may now be placed farther along the end-board toward the middle, where they serve best for battens to it.

I make the end-board B a little lower than the side-boards D, so that rod A, placed upon it, will drop into the notches of the side-boards flush with the upper edges.

Having thus fully described my invention, I claim as new and desire to secure by Letters Patent—

1. The wear-strip bar A for the top of the end-board, having screw-threaded extensions C through notches F in the top of the side-boards, and provided with binding-nuts E, having connection with the side-boards to prevent the end-board from rising, substantially as described.

2. The combination of plates G, having curved rib H, and a notch in the top, with the bar-strip A C, attached to the end-board, and with the nuts E, having a groove coinciding with rib H, substantially as specified.

3. The plate G, having segmental rib H, in combination with nut E, having a segmental groove coincident with said rib, said plate being attached to the side of the wagon-box, and having a notch in the top, and said nut being screwed on the bar-strip attached to the end-board, substantially as described.

FRED WISNER.

Witnesses:
J. M. WILLIAMS,
CLINTON R. WILLIAMS.